United States Patent [19]
Fennhoff et al.

[11] Patent Number: 5,151,452
[45] Date of Patent: Sep. 29, 1992

[54] PURIFICATION OF POLYCARBONATE AND POLYESTER CARBONATE WASTE

[75] Inventors: Gerhard Fennhoff, Willich; Wolfgang Jakob, Moers; Manfred Ehlert, Dormagen; Dieter Freitag, Krefeld, all of Fed. Rep. of Germany

[73] Assignee: Bayer Aktiengesellschaft, Fed. Rep. of Germany

[21] Appl. No.: 761,209

[22] Filed: Sep. 17, 1991

[30] Foreign Application Priority Data

Sep. 21, 1990 [DE] Fed. Rep. of Germany ....... 4029886
Dec. 7, 1990 [DE] Fed. Rep. of Germany ....... 4039024

[51] Int. Cl.$^5$ .............................................. C08J 11/04
[52] U.S. Cl. ........................................ 521/48; 521/40; 521/40.5
[58] Field of Search ....................... 521/48, 40.5, 40

[56] References Cited

U.S. PATENT DOCUMENTS

| | | | |
|---|---|---|---|
| 3,070,553 | 12/1962 | Nagle et al. | 521/48 |
| 3,098,046 | 4/1960 | Siggel et al. | 521/48 |
| 3,565,852 | 2/1971 | Conix | 521/48 |
| 3,652,466 | 3/1972 | Hittel et al. | 521/48 |
| 4,118,346 | 10/1978 | Summers | 521/40 |
| 4,143,001 | 3/1979 | Raab et al. | 521/48 |
| 4,212,774 | 7/1980 | Idel | 521/40 |
| 4,602,046 | 7/1986 | Baser et al. | 521/48 |

FOREIGN PATENT DOCUMENTS

| | | |
|---|---|---|
| 1422813 | 12/1968 | Fed. Rep. of Germany . |
| 2814908 | 10/1978 | Fed. Rep. of Germany ........ 521/48 |
| 3511711 | 10/1986 | Fed. Rep. of Germany . |

OTHER PUBLICATIONS

Chemical Abstracts, No. 212203J, vol. 94, No. 26.
Chemical Abstracts, No. 180875B, vol. 112, No. 20.

*Primary Examiner*—Kriellion S. Morgan
*Assistant Examiner*—Olga Asinovsky
*Attorney, Agent, or Firm*—Joseph C. Gil; Aron Pries

[57] ABSTRACT

A process is disclosed for the purification of lacquer- and optionally dye and metal- containing waste of thermoplastic aromatic polycarbonates and/or thermoplastic aromatic polyester carbonates. The waste which result upon the production of moldings, such as audio compact discs, lenses for spectacles or head-lamp reflectors is processed in accordance with the invention to yield useful resin suitable for reprocessing as a molding resin. In accordance with the process, the waste is first size-reduced and then heated with acid to the reflux temperature while stirring. After a water wash there is followed a drying step. In accordance with the process, in instances where the waste does not originally contain metal, the metal in powder form is added before the acid treatment.

11 Claims, No Drawings

PURIFICATION OF POLYCARBONATE AND POLYESTER CARBONATE WASTE

Audio compact discs are produced from aromatic polycarbonates by injection molding. The moldings thus produced are metallized by vapor deposition of aluminium and are surface-sealed with crosslinked lacquers. In addition, they are printed with dyes. Lastly, they are subjected to a quality control in which 10% to 15% of the compact discs produced are rejected because of defects.

In the same way as audio compact discs, lenses are surface-sealed with crosslinked lacquers or with polysiloxanes. In this case, too, considerable quantities of polymer waste accumulate as a result of quality control.

Lamp and headlamp reflectors are coated with aluminium. Waste accumulates both during the production of these moldings and after their use.

On account of its aluminium content, the lacquers and the dyes, if any, this polycarbonate and/or polyester carbonate waste cannot be re-used by direct re-injection or in admixture with other polymers and/or polycondensates for other high-quality moldings.

Accordingly, the problem addressed by the present invention was to work up the waste mentioned above by a simple, industrially workable process in such a way that the aromatic polycarbonates and/or aromatic polyester carbonates could be re-used.

Accordingly, the present invention relates to a process for the purification of waste of thermoplastic aromatic polycarbonates and/or thermoplastic aromatic polyester carbonates which accumulates in the production of optical moldings, such as for example audio compact discs, lenses for spectacles or for other optical applications or lamp or headlamp reflectors.

The present invention is characterized in particular in that the polycondensate waste is size-reduced in a shredder or a mill of the type described in the literature (see, for example, Ullmanns Encyklopädie der technischen Chemie, 4th Edition (1972), Vol. 2, Verfahrenstechnik I (Grundoperationen) pages 2–34), heated with acid to the reflux temperature while stirring, washed while stirring gently with water until neutral so that the lacquer components removed from the polycondensate, but not yet dissolved are rinsed from the polycondensate, the polycondensate is dried in standard dryers of the type described, for example, in Ullmanns Encyklopädie der technischen Chemie, 4th Edition (1972), Vol. 2, Verfahrenstechnik I (Grundoperationen), pages 699 to 721, after removal of the water by filtration and is optionally separated from any remaining lacquer residues or dye residues by air separation in apparatus of the type described, for example, in Ullmanns Encyklopädie der technischen Chemie, 4th Edition (1972), Vol. 2, Verfahrenstechnik I (Grundoperationen), pages 57 to 69. In cases where the polycondensate waste does not itself contain any metals, the metals are separately added, for example in powder form, before the acid, optionally even in the form of metal salts.

Accordingly, the present invention relates in particular to a process for the purification of waste of thermoplastic aromatic polycarbonates and/or thermoplastic aromatic polyester carbonates which contains metals, optionally in the form of metal salts, lacquers and, optionally, dyes, characterized in that the waste is size-reduced to fragments having an average diameter of 0.1 cm to 5.0 cm and preferably 0.5 cm to 1.5 cm, the fragments are subsequently refluxed with acid while stirring, subsequently washed neutral and after that washed with water while stirring and thereafter washed with water until all the lacquer components removed from the polycondensate have been rinsed out, the fragments are filtered off, dried and any lacquer and/or dye residues still adhering to the fragments are optionally removed by air separation.

It has surprisingly been found that, by treating the polycondensate waste with acid, most of the lacquers are also separated from the polycarbonates after dissolution of the metal and are even partly dissolved.

In the absence of a metal, such as aluminium for example, this effect does not occur because, without aluminium, reactive species, such as nascent hydrogen and aluminium (III) salts, cannot be formed "in situ".

Apart from aluminium, suitable metals for the purification process according to the invention are iron, zinc and tin. However, iron, zinc and tin are weaker in their effect than aluminium.

Lacquers which may be removed from the polymer and partly dissolved in accordance with the present invention are, for example, lacquers based on polyacrylonitrile, polyacrylate, polymethacrylate, polyvinyl chloride, polysiloxane or melamine resin.

Dyes suitable for the purification process according to the invention are, for example, dyes based on naphthaquinones, benzoquinones, anthraquinones and azo compounds and also organic pigments and inorganic pigments, such as iron oxides, chromium oxides and titanium dioxide.

Thermoplastic aromatic polycarbonates in the context of the invention are polycarbonates which have been produced from diphenols and carbonate donors by any of the standard methods known from the literature (see for example H. Schnel, Chemistry and Physics of Polycarbonates, Interscience Publishers, New York, 1964; U.S. Pat. No. 3,028,365 and DE-OS 3 832 396 (Le A 26 344).

Diphenols for such polycarbonates may be, for example, hydroquinones, resorcinols, dihydroxydiphenyls, bis-(hydroxyphenyl)-alkanes, bis-(hydroxyphenyl)-cycloalkanes, bis-(hydroxyphenyl)-sulfines, bis-(hydroxyphenyl)-ethers, bis-(hydroxyphenyl)-ketones, bis-(hydroxyphenyl)-sulfones, bis-(hydroxyphenyl)-sulfoxides, α,α'-bis-(hydroxyphenyl)-diisopropyl, benzenes and nucleus-alkylated and nucleus-halogenated compounds thereof.

Preferred diphenols are, for example, 4,4'-dihydroxydiphenyl, 2,2-bis-(4-hydroxyphenyl)-propane, 2,4-bis-(4-hydroxyphenyl)-2-methyl butane, 1,1-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methyl butane, 1,1-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-3,3,5-trimethyl cyclohexane.

Particularly preferred diphenols are, for example, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)- cyclohexane and 1,1-bis-(4-hydroxyphenyl)-3,3,5-trimethyl cyclohexane.

Mixtures of the diphenols mentioned above may also be used.

The diphenols are either known from the literature or may be produced by known methods.

Aromatic polyester carbonates in the context of the invention are those synthesized from at least one aromatic bisphenol, from at least one aromatic dicarboxylic acid and from carbonic acid. Suitable diphenols are those mentioned above. Suitable aromatic dicarboxylic acids are, for example, orthophthalic acid, terephthalic acid, isophthalic acid, tert. butyl isophthalic acid, 3,3'-diphenylether dicarboxylic acid, 4,4'-diphenyl dicarboxylic acid, 4,4'-diphenylether dicarboxylic acid, 4,4'-benzophenone dicarboxylic acid, 3,4'-benzophenone dicarboxylic acid, 4,4'-diphenyl sulfone dicarboxylic acid, 2,2-bis-(4-carboxyphenyl)-propane, trimethyl-3-phenylindane-4,5'-dicarboxylic acid.

Of the aromatic dicarboxylic acids, terephthalic acid and/or isophthalic acid are particularly preferred.

The aromatic polyester carbonates may be produced by methods of the type known from the literature for the production of polycarbonates, for example by processes in homogeneous solution, by melt transesterification processes and by the two-phase interfacial process.

Aromatic polycarbonates and aromatic polyester carbonates in the context of the invention are those which have a number average molecular weight $M_n$ in the range from 5,000 to 15,000 and preferably in the range from 7,000 to 13,000, as determined by gel permeation chromatography using polystyrene as standard.

Acids in the context of the invention are aqueous mineral acids, such as for example hydrohalic acids, the halogen being chlorine, bromine or iodine; perchloric acid, phosphoric acid or sulfuric acid.

Acids in the context of the invention, too, are organic acids, such as for example formic acid and acetic acid.

Metal salt/acid combinations suitable for adding to non-metallized lacquered polycondensate waste are, for example, solutions of aluminium (III) halides in aqueous hydrohalic acids, the halogen being chlorine, bromine or iodine; or hydrohalic acids together with aluminium powder.

Particularly preferred acids are hydrohalic acids and acetic acid.

The concentrations of the acids in water are between 1% by weight and preferably between 10% by weight and 15% by weight, based on the total weight of the solution of acids and water.

The time required for heating under reflux is generally between 20 minutes and 180 minutes. The fragments filtered off are dried at temperatures of 100° to 120° C. The polycondensate fragments optionally purified by air separation can be reprocessed to useful polycarbonate moldings or polyester carbonate moldings by standard injection molding or extrusion processes. They are useful in the production of blends with other plastics, and in particular in the production of blends containing graft polymers of acrylonitrile, butadiane and styrene (ABS) and/or copolymers of acrylonitrile and styrene (SAN). Thus the present invention relates also to mixtures of the recycled thermoplastic aromatic polycarbonates and/or thermoplastic aromatic polyester-carbonates with other plastics, in particular containing (ABS) and/or (SAN).

EXAMPLES

A. The waste compact discs used for the following tests (polycarbonate vapor-coated with aluminium and lacquered) were size-reduced beforehand in a shredder to a particle size of 1 mm to 15 mm. The shredded product obtained contained a total of 0.35% by weight lacquer (crosslinked polyacrylonitrile and crosslinked polyvinyl chloride) and aluminium.

The relative solution viscosity of the polycarbonate in the shredded material after mechanical separation of lacquers and aluminium (comparison substance) (0.5 g polycarbonate in 100 ml dichloromethane at 23° C.) was 1.196.

EXAMPLE 1

300 g of the shredded compact disc waste mentioned above are added with stirring to 450 g of a 10% hydrochloric acid solution and heated for 35 minutes to the boiling temperature so that all the aluminium and parts of the lacquers are dissolved and the remaining lacquer residues have separated from the polycarbonate. After removal of the hydrochloric acid, the polycarbonate is washed with distilled water until neutral and the lacquer residues remaining behind are rinsed out. After the polycarbonate has been filtered off, the polycondensate is dried at 120° C. and final traces of lacquer are removed by air separation in a stream of nitrogen.

Relative solution viscosity of the polycarbonate after air separation 1.194 (0.5 g polycarbonate in 100 ml dichloromethane at 23° C.).

EXAMPLE 2

100 kg of the polycarbonate waste described in A. are introduced into a 500 l enamelled tank with a flanged-on filter and a flotation outlet. The tank is evacuated and then purged with nitrogen. The gas exchange is repeated another two times and, finally, the tank is blanketed with 15 m$^3$ nitrogen per hour. 160 kg 10% hydrochloric acid are added to the contents of the tank which are then heated with stirring to 90° C. and kept at that temperature for 1 hour. The contents of the tank are then cooled to 30° C. and the hydrochloric acid is drained off. The polycarbonate remaining in the tank is washed with 3× deionized water until free from acid, the lacquer residues separated from the polycarbonate being removed. Finally, the polycarbonate is dried at 120° C.; the air separation step is omitted. Relative solution viscosity of the polycarbonate after air separation 1.193 (0.5 g polycarbonate in 100 ml dichloromethane at 23° C.).

B. The polycarbonate waste used for the following tests (polycarbonate coated with lacquer) was size-reduced beforehand to a particle size of 1 mm to 15 mm in a shredder. The shredded material obtained contained a total of 0.5% by weight lacquer (based on polysiloxane and melamine resin). The relative solution viscosity of the polycarbonate of the shredded material after mechanical separation of the lacquers (comparison substance) (0.5 g polycarbonate in 100 ml dichloromethane at 23° C.) was 1.279.

In Examples 3 to 6 below, the air separation step was omitted.

EXAMPLE 3

As Example 1, but with 300 g of the polycarbonate waste described in B. and 0.5 g aluminium.

A solution of the dried and purified polycarbonate (50 g polycarbonate in 100 ml dichloromethane) still contains 1/10th of the quantity of lacquer present in a comparison solution of the starting material (50 g polycarbonate waste in 100 ml dichloromethane).

Relative solution viscosity of the polycarbonate 1.277 (0.5 g polycarbonate in 100 ml dichloromethane at 23° C.).

EXAMPLE 4

As Example 1, but with 300 g of the polycarbonate waste described in B., 450 g 10% hydrochloric acid solution and 1.5 g aluminium powder.

A solution of the dried and purified polycarbonate (50 g polycarbonate in 100 ml dichloromethane) still contains 1/10th of the quantity of lacquer present in a comparison solution of the starting material (50 g polycarbonate waste in 100 ml dichloromethane). Relative solution viscosity of the polycarbonate 1.277 (0.5 g polycarbonate in 100 ml dichloromethane at 23° C.).

EXAMPLE 5

As Example 1, but with 300 g of the polycarbonate waste described in B., 450 g 10% hydrochloric acid solution and 7.3 g aluminium (III) chloride.

A solution of the dried and purified polycarbonate (50 g polycarbonate in 100 ml dichloromethane) still contains 1/5th of the quantity of lacquer present in a comparison solution of the starting material (50 g polycarbonate waste in 100 ml dichloromethane). Relative solution viscosity of the polycarbonate 1.277 (0.5 g polycarbonate in 100 ml dichloromethane at 23° C.).

EXAMPLE 6

Comparison Example

As in Example 1, but with 300 g of the polycarbonate waste described in B., 450 g 10% hydrochloric acid solution, but no aluminium powder.

A solution of the dried and purified polycarbonate (50 g polycarbonate in 100 ml dichloromethane) still contains 2/3rds of the quantity of lacquer present in a comparison solution of the starting material (50 g polycarbonate waste in 100 ml dichloromethane).

EXAMPLE 7

As Example 1, but with 450 g of a 10% acetic acid. Relative solution viscosity of the polycarbonate after air separation 1194 (0.5 g polycarbonate in 100 ml dichloromethane at 23° C.).

What is claimed is:

1. A process for the purification of resinous waste of at least one polycondensate selected from the group consisting of thermoplastic aromatic polycarbonates and thermoplastic aromatic polyester carbonates which waste contains lacquers and optionally dyes and/or metal contaminants comprising in sequence (i) size-reducing the waste to fragments having an average particle size of 0.1 to 5.0 cm, (ii) refluxing said fragments with an aqueous mineral acid while stirring to effect removing of said lacquer and/or dye from said polycondensate, (iii) water-washing while stirring until neutral and until all the lacquer and/or dye components removed from the polycondensate have been rinsed out, (iv) filtering the remaining liquids and drying the resultant fragments, with the proviso where said waste contains no metal contaminants, added metal is introduced to the process before said (ii).

2. The process of claim 1 wherein said added metal is a metal salts.

3. The process of claim 1 wherein said particle size is about 0.5 to 1.5 cm.

4. The process of claim 1 wherein any lacquer residue still adhering to the fragments are removed by air separation subsequent to said (iv).

5. The process of claim 1 wherein said metal is at least one member selected from the group consisting of aluminum, iron, zinc and tin.

6. The process of claim 1 wherein said acid is at least one member selected from the group consisting of hydrohalic acid, perchloric acid, phosphoric acid and sulfuric acid.

7. The process of claim 1 wherein said added metal is added in combination with said acid.

8. The process of claim 7 wherein said combination is a solution of aluminum (III) halides in aqueous hydrohalic acid.

9. The process of claim 7 wherein said combination is a solution of aluminum powder in aqueous hydrohalic acid.

10. The process of claim 1 wherein said lacquers are based on a member selected from the group consisting of polyacrylonitrile, polyacrylate, polymethacrylate, polyvinyl chloride, polysiloxane and melamine resin.

11. A thermoplastic molding composition comprising the product prepared by the process of claim 1.

* * * * *